(12) United States Patent
Subrahmanyam et al.

(10) Patent No.: US 6,486,878 B1
(45) Date of Patent: Nov. 26, 2002

(54) METHOD FOR DETECTING INCORRECTLY ORIENTED LOFTED SOLIDS IN A SOLID MODELING SYSTEM

(75) Inventors: Somashekar Ramachandran Subrahmanyam, Farmington Hills, MI (US); Mahabaduge Janakakithsiri Jayasuriya, Brighton, MI (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/358,670

(22) Filed: Jul. 22, 1999

(51) Int. Cl.[7] .............................................. G06T 17/00
(52) U.S. Cl. ....................................................... 345/420
(58) Field of Search ................................ 345/418, 419, 345/420, 619

(56) References Cited

U.S. PATENT DOCUMENTS 5,627,949 A * 5/1997 Letcher, Jr. .................. 345/420

OTHER PUBLICATIONS

Vasilis Capoyleas, et al., "Generic Naming in Generative, Constraint–based Design", *Computer–Aided Design*, vol. 28, No. 1, 1996, pp. 17–26.

Xiangping Chen, et al., "On Editability of Feature–Based Design", Department of Computer Science, Purdue University, Report CSD–TR–94–067, Nov. 1994, pp. 1–23.

Jiri Kripac, "A Mechanism for Persistantly Naming Topological Entities in History–based Parametric Solid Models", *Computer–Aided Design*, vol. 29, No. 2, 1997, pp. 113–122.

* cited by examiner

*Primary Examiner*—Cliff N. Vo
(74) *Attorney, Agent, or Firm*—Gates & Cooper LLP (57) ABSTRACT

A computer-implemented solid modeling system that detects incorrect orientations of lofted solids involving non-degenerate, degenerate, closed cases, and then ensures that the face normals of the lofted solids are correctly oriented, so that they are pointing outwards with respect to the material side of each face.

36 Claims, 12 Drawing Sheets

METHOD FOR DETECTING INCORRECTLY ORIENTED LOFTED SOLIDS IN A SOLID MODELING SYSTEM

BACKGROUND OF THE INVENTION

1. Field of the Invention

The present invention relates generally to computer-assisted drafting (CAD) systems, and in particular, to a method, apparatus, and article of manufacture for detecting incorrectly oriented lofted solids in a solid modeling system.

2. Description of the Related Art

Over the last decade, designers have changed their fundamental approach to graphics design, moving from 2D drawing systems to 3D solid modeling systems. New software makes solid modeling technology available and affordable to virtually anyone.

Solid modeling is a technique that allows designers to create dimensionally accurate 3D solid models in 3D space represented within a computer, rather than traditional 2D drawings. 3D solid models include significantly more engineering data than 2D drawings, including the volume, bounding surfaces, and edges of a design.

With the graphics capabilities of today's computers, these 3D solid models may be viewed and manipulated on a monitor. In addition to providing better visualization, 3D solid models may be used to automatically produce 2D drawing views, and can be shared with manufacturing applications and the like.

Some 3D solid modeling systems generate parametric feature-based models. A parametric feature-based model is comprised of intelligent features, such as holes, fillets, and chamfers. The geometry of the parametric feature-based model is defined by underlying mathematical relationships (i.e., parameters) rather than by simple unrelated dimensions, which makes them easier to modify. These systems preserve design intent and try to maintain it after every change to the model.

Moreover, these features are automatically adjusted as the model is modified. The system computes any related changes to parts of the model that are dependent on a parameter, and automatically updates the entire model when the parameter is changed. For example, a through-hole will always go completely through a specified part, even if the part's dimensions are changed.

Lofting is a useful technique for generating complex shapes in parametric feature based solid modeling systems. Typically, the user provides the system with input in the form of a number of 2D cross-sections, in a specific order, along with parameters such as tangency conditions, take-off angles, and weight factors. The system then processes this input into a 3D sheet. If needed, this 3D sheet is covered by faces at the ends, in order to convert it into a lofted solid.

However, after the sheet is covered by faces, there is no guarantee that the lofted solid is properly oriented. It is a requirement that the lofted solid be closed, connected, regular, and have a finite positive volume. To satisfy the finite positive volume requirement, it is necessary that the face normals of all the faces covering the 3D sheet are pointing outwards, with respect to the material side of the faces. The convention used by a geometric modeler is that loops are comprised of co-edges, which are oriented so that looking along the co-edge with the face normal pointing upwards, the face is on the left.

Thus, there is a need in the art for a solid modeling system that detects incorrectly oriented loft features. In addition, there is a need in the art for a solid modeling system that corrects the face normals for any incorrect orientation.

SUMMARY OF THE INVENTION

To address the requirements described above, the present invention discloses computer-implemented solid modeling system that detects incorrect orientations of lofted solids, and then ensures that the face normals of the lofted solids are correctly oriented, so that they are pointing outwards with respect to the material side of each face.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, byway of illustration, an embodiment of the present invention. It is understood that other embodiments may be utilized and structural changes may be made without departing from the scope of the present invention.

Overview

The present invention is a computer-implemented solid modeling system that detects incorrect orientations of lofted solids, and then ensures that the face normals of the lofted solids are correctly oriented, so that they are pointing outwards with respect to the loops material side of each face.

Hardware and Software Environment

Figure 1:
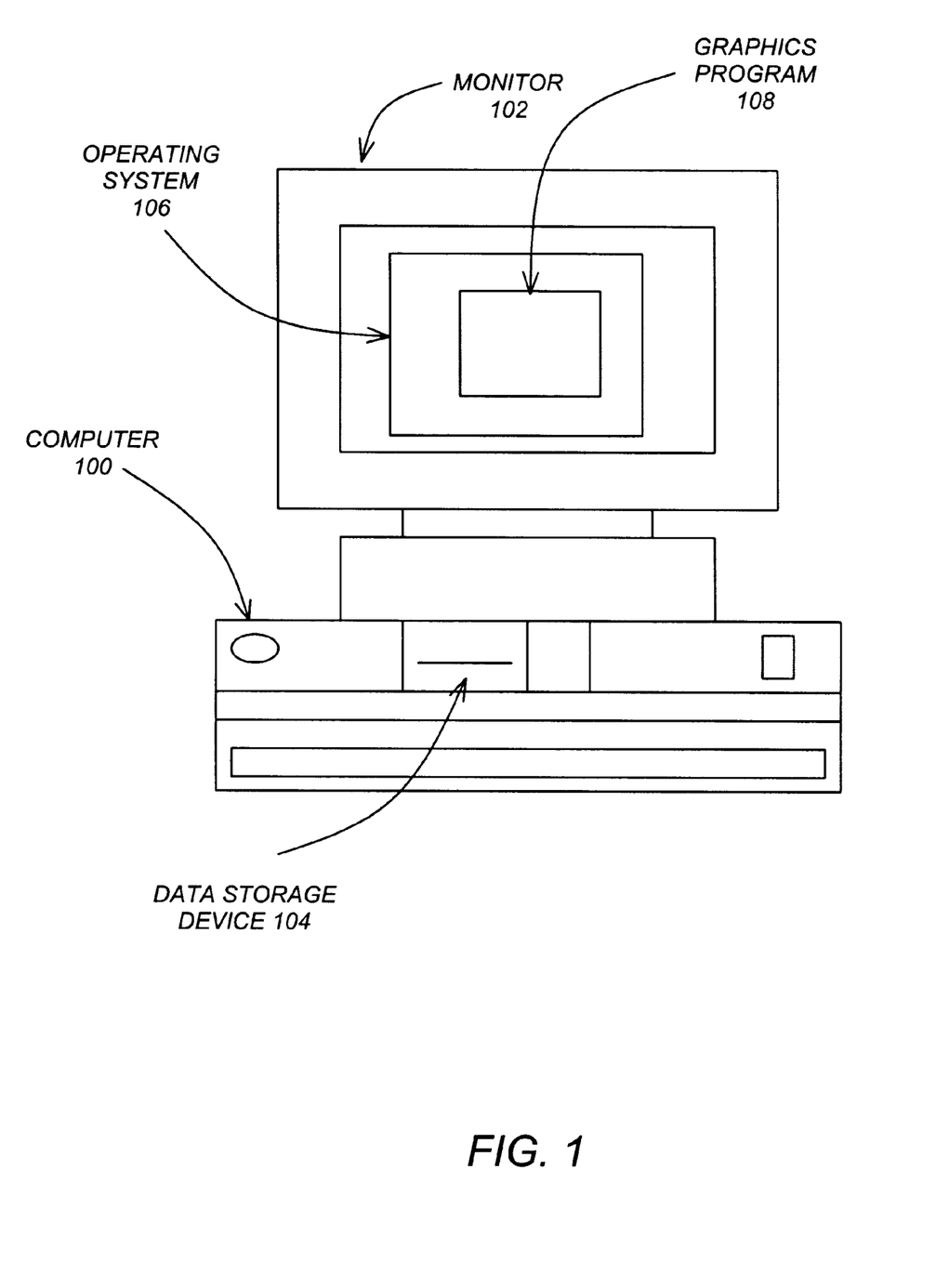
FIG. 1 is an exemplary hardware and software environment used to implement the preferred embodiment of the invention.

FIG. 1 is an exemplary hardware and software environment used to implement the preferred embodiment of the invention. The preferred embodiment of the present invention is typically implemented using a computer 100, which generally includes, inter alia, a monitor 102, data storage devices 104, and other devices. Those skilled in the art will recognize that any combination of the above components, or any number of different components, peripherals, and other devices, may be used with the computer 100.

The computer 100 usually operates under the control of an operating system 106, which is represented by a window displayed on the monitor 102. The preferred embodiment of the present invention is implemented by a computer-implemented graphics program 108 that operates under the control of the operating system 106, wherein the graphics program 108 also is represented by a window displayed on the monitor 102.

Generally, the operating system 106 and graphics program 108 comprise logic and/or data embodied in or readable from a device, media, or carrier, e.g., one or more fixed and/or removable data storage devices 104 connected directly or indirectly to the computer 100, one or more remote devices coupled to the computer 100 via a data communications devices, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Computer-implemented Graphics Program

Figure 2:
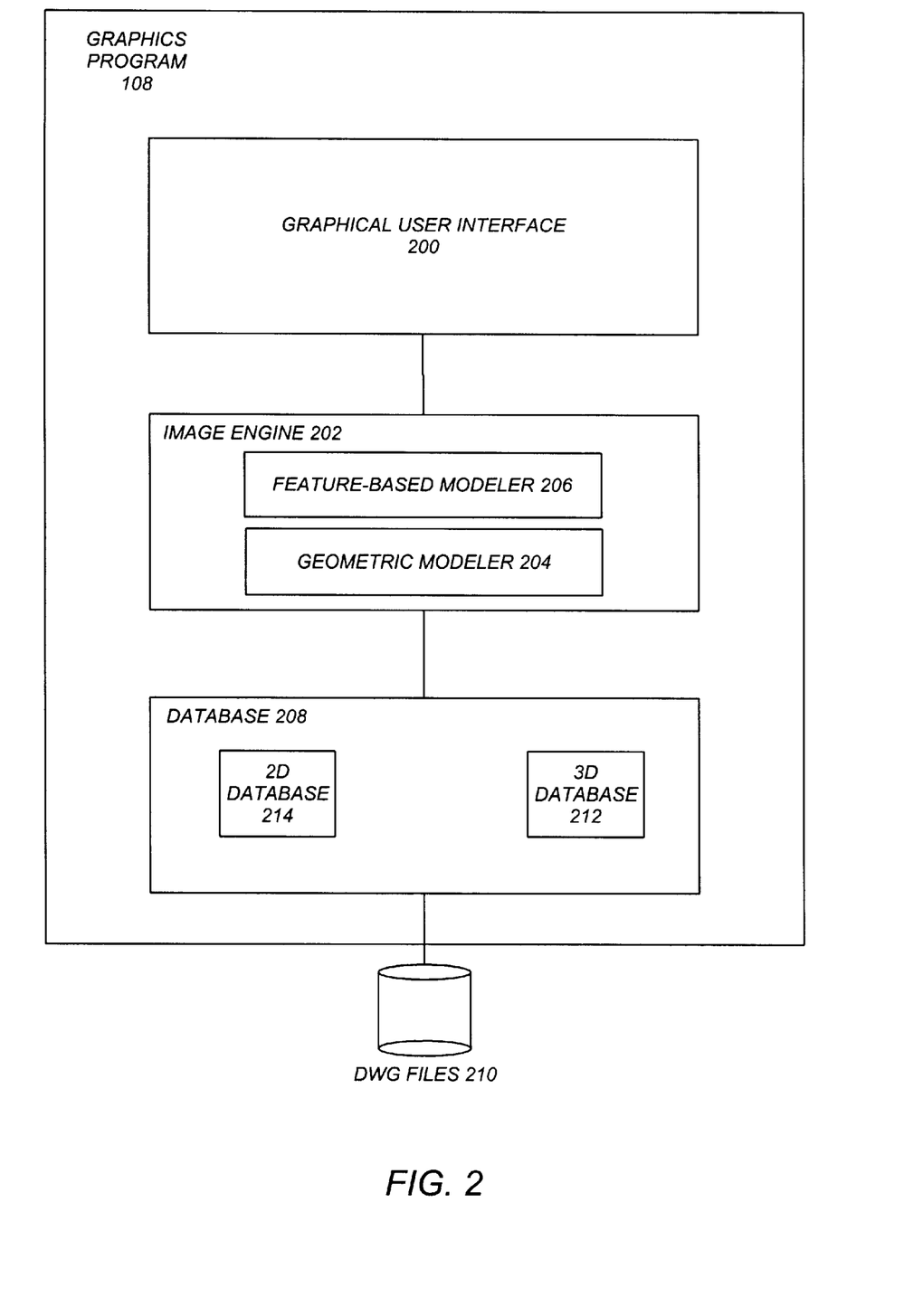
FIG. 2 is a block diagram that illustrates the components of the graphics program according to the preferred embodiment of the present invention.

FIG. 2 is a block diagram that illustrates the components of the graphics program 108 according to the preferred embodiment of the present invention. There are three main components to the graphics program 108, including: a Graphical User Interface (GUI) 200, an Image Engine (IME) 202 including a Geometric Modeler (GM) 204 and Feature-Based Modeler (FM) 206, and a database (DB) 208 for storing objects in Drawing (DWG) files 210.

The Graphical User Interface 200 displays information to the user and provides the functionality for the user's interaction with the graphics program 108.

The Image Engine 202 processes the Database 208 or DWG files 210 and delivers the resulting graphics to an output device. In the preferred embodiment, the Image Engine 202 provides a complete application programming interface (API) that allows other computer programs to interface to the graphics program 108 as needed.

The Geometric Modeler 204 primarily creates geometry and topology for models. The Feature-Based Modeler 206, which interacts with the Geometric Modeler 204, is a parametric feature-based solid modeler that integrates 2D and 3D mechanical design tools, including parametric assembly modeling, surface modeling, 2D design, and associative drafting. The Feature-Based Modeler 206 provides powerful solid-, surface-, and assembly-modeling functionality.

The Database 208 is comprised of two separate types of databases: (1) a 3D database 212 known as the "world space" that stores 3D information; and (2) one or more 2D databases 214 known as the "virtual spaces" or "view ports" that stores 2D information derived from the 3D information. The 3D database 212 captures the design intent and behavior of a component in a model.

Object Structure

Figure 3:
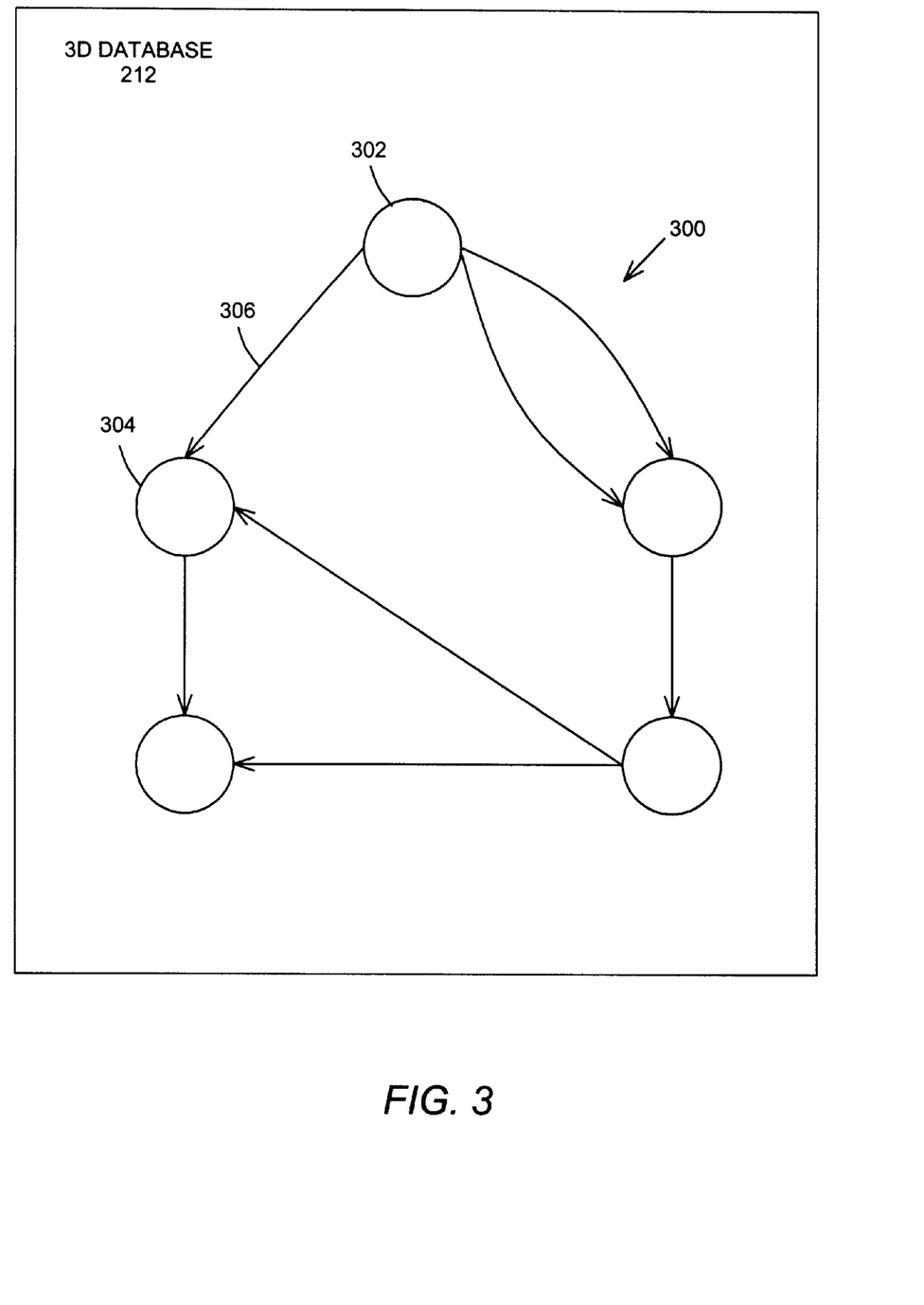
FIG. 3 is a block diagram that illustrates an object structure maintained by the 3D database according to the preferred embodiment of the present invention.

FIG. 3 is a block diagram that illustrates an object structure 300 maintained by the 3D database 212 according to the preferred embodiment of the present invention. Each object structure 300 includes a header node 302 and usually includes one or more nodes 304 connected by zero or more edges 306. There may be any number of different object structures 300 maintained by the 3D database 212. Moreover, a node 304 may be a member of multiple structures 300 in the 3D database 212. According to the preferred embodiment, these object structures may represent lofted solids.

Operation of the Preferred Embodiment

Figure 4A:
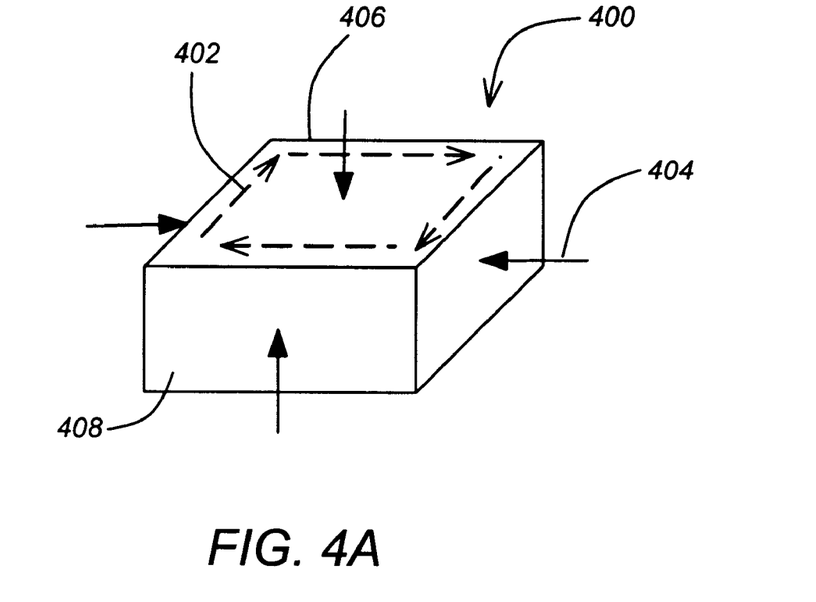
FIG. 4A illustrates a lofted solid that is incorrectly oriented and FIG. 4B illustrates a lofted solid that is correctly oriented.
Figure 4B:
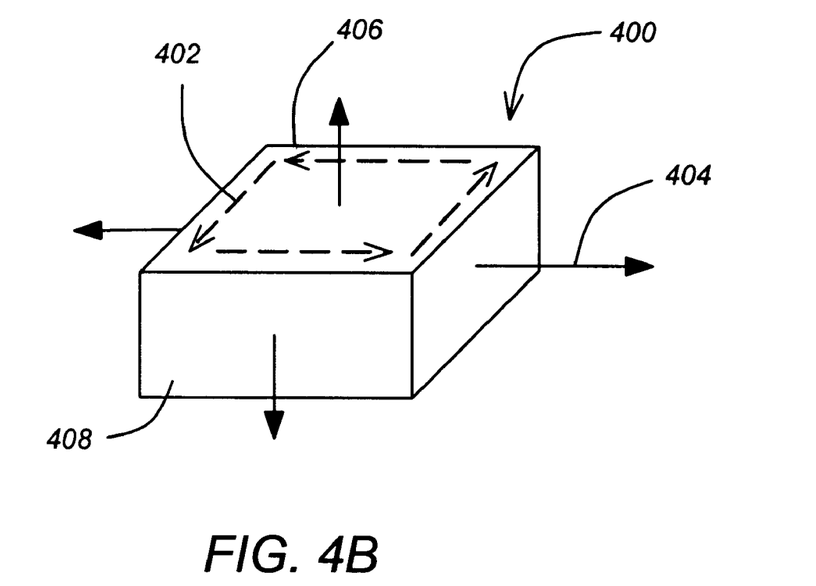

The preferred embodiment detects whether the lofted solids maintained in the 3D database 212 are correctly oriented with regard to the material side of their faces and reverses the face normals if, the lofted solid is not correctly oriented. FIG. 4A illustrates a lofted solid 400 (i.e., a box) that is incorrectly oriented and FIG. 4B illustrates the lofted solid 400 after it has been correctly oriented. Co-edges are shown as dashed arrows 402 and face normals are shown as solid arrows 404.

In the example of FIGS. 4A and 4B, a 3D sheet 406 is generated by the Geometric Modeler 204 from user input, which typically comprises one or more 2D planar sections in a specified order, along with other parameters. The Geometric Modeler 204 then covers the 3D sheet 406 with faces 408 at its ends to generate the lofted solid 400. The Feature-Based Modeler 206 determines whether the lofted solid 400 is correctly oriented, in that the face normals 404 of all the faces 408 are pointing outwards with respect to their loops of co-edges 402. If the lofted solid 400 is not correctly oriented, the Feature-Based Modeler 206 reverses the face normals 404.

Figure 5:
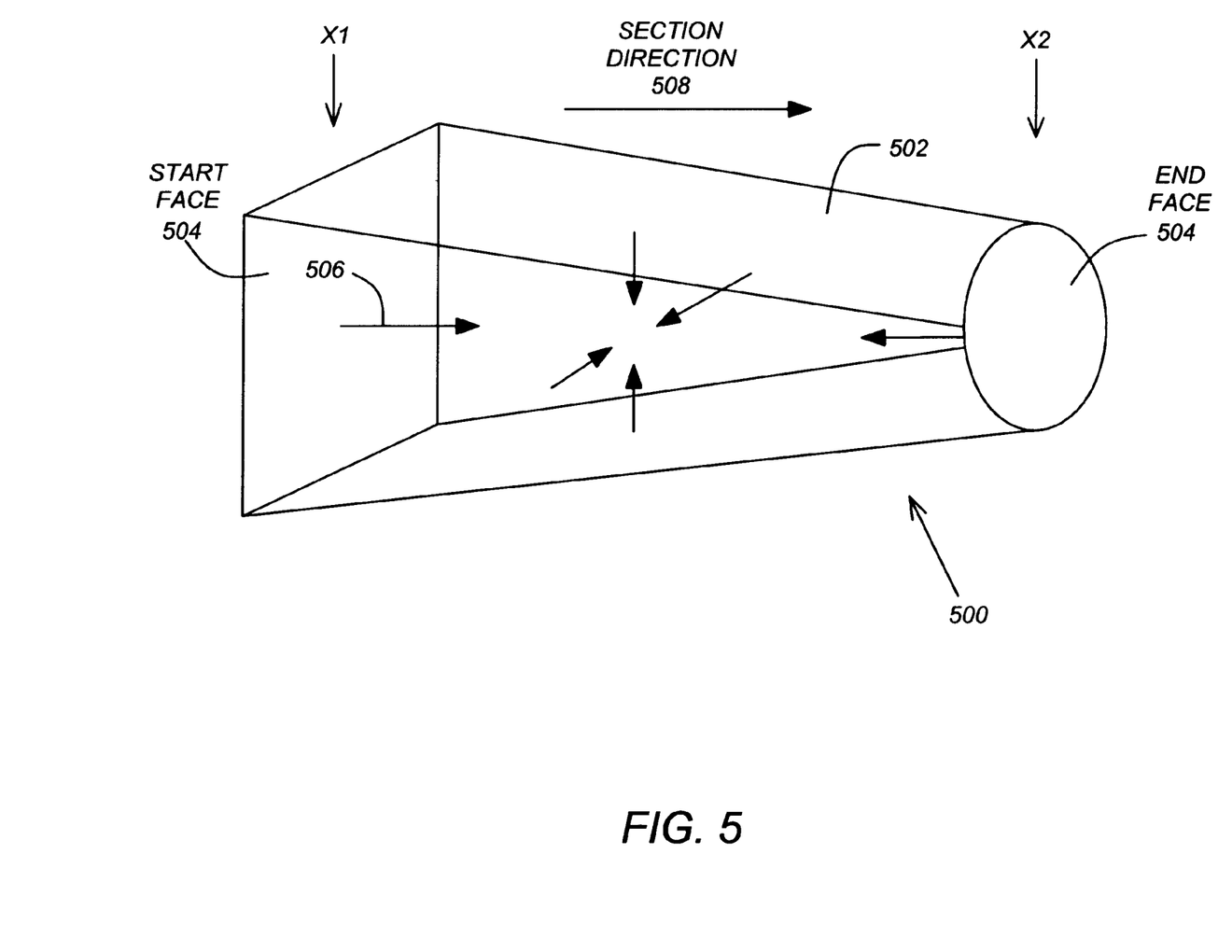
FIG. 5 illustrates a more complex lofted solid comprised of two sections, four lateral faces, and two transverse faces according to the preferred embodiment.

FIG. 5 illustrates a more complex lofted solid 500 comprised of two ordered sections $\{X_1, X_2\}$, four lateral faces 502, and two transverse faces 504. Each of the sections $X_1$ and $X_2$ in the lofted solid 500 may comprise closed profiles, closed face loops, or points. In general, a section $X_1$ or $X_2$ comprises a number of segments (lines, arcs, splines).

The assumptions of the preferred embodiment are:

Sections $X_n$ are planar and two consecutive sections $X_n$ and $X_{n+1}$ cannot lie on the same plane.

Degenerate sections $X_n$ are start or end sections only.

A closed lofted solid has no degenerate sections $X_n$ and has at least three or more non-degenerate sections $X_n$.

The lofted solid 500 in FIG. 5 is also comprised of lateral faces 502, which are created by taking at least one segment per section $X_1$ and fitting a smooth procedural surface through corresponding aligned segments on the other section $X_2$.

Planar transverse faces 504 are also created by a subsequent covering operation, in the plane of the start and end sections $X_1$ and $X_2$. The transverse face 504 created at the first section $X_1$ is known as the "START face" and the transverse face 504 at the second, i.e., $n^{th}$, section $X_2$ is known as the "END face."

After the covering operation, all face normals 506 (indicated by the solid arrows) in the lofted solid 500 are either pointing inwards or outwards. However, there is no guarantee that the lofted solid 500 is properly oriented. Specifically, it is necessary that the face normals 506 of all the faces 502 and 504 are pointing outwards with respect to their loops, which are comprised of co-edges.

The basis for finding the correct orientation is the scalar product of the section direction 508 ($v_r$) and the transverse face 504's normal ($f_n$) either at the START or END faces 504. The section direction 508 exists in all cases involving degenerate sections and closed lofts. However, the transverse faces 504 may not exist. In such cases, the system looks at other information which will determine the face normals 506 required for orientation detection. The system applies a reverse operation on the lofted solid 500, if Equation 1.1 below is satisfied:

$$(v_r \cdot f_n) > 0.0 \tag{1.1}$$

The reverse operation "flips" the normals 506 of all the faces 502 and 504 in the lofted solid 500. Equation 1.1 is the condition for detecting incorrectly oriented lofted solids 500. The analysis performed by the system differs based on the following three cases.

Case 1: Transverse Faces Exist

As noted above, FIG. 5 illustrates a lofted solid 500 having transverse faces 504. A non-closed lofted solid 500 with zero or one work points will always have END faces 504. The value of $v_r$ is determined depending on whether the START or the END face 504 exists. The value $v_r$ for the START face 504 is the section direction 508 from $X_1$ to $X_2$. Similarly, for the END face 504, it is the direction from the $n^{th}$ section ($X_2$) to the $(n-1)^{th}$ section ($X_1$). In general, the section direction 508 is a vector resulting from the difference of the geometric centers of the two sections $X_1$ and $X_2$. The reference face normal ($f_n$) is the face normal 506 of the START or END face 504. If the START face 504 exists, then the system uses the reference direction for the START face 504 and its face normal 506. If the START face 504 does not exist, then the system uses the reference direction for the END face 504 and its face normal 506. For the lofted solid 500 shown in FIG. 5, Equation 1.1 is satisfied and hence it is incorrectly oriented. As a result, the system applies the reverse operation to correctly orient the face normals 506.

Case 2: Transverse faces do not exist

Figure 6:
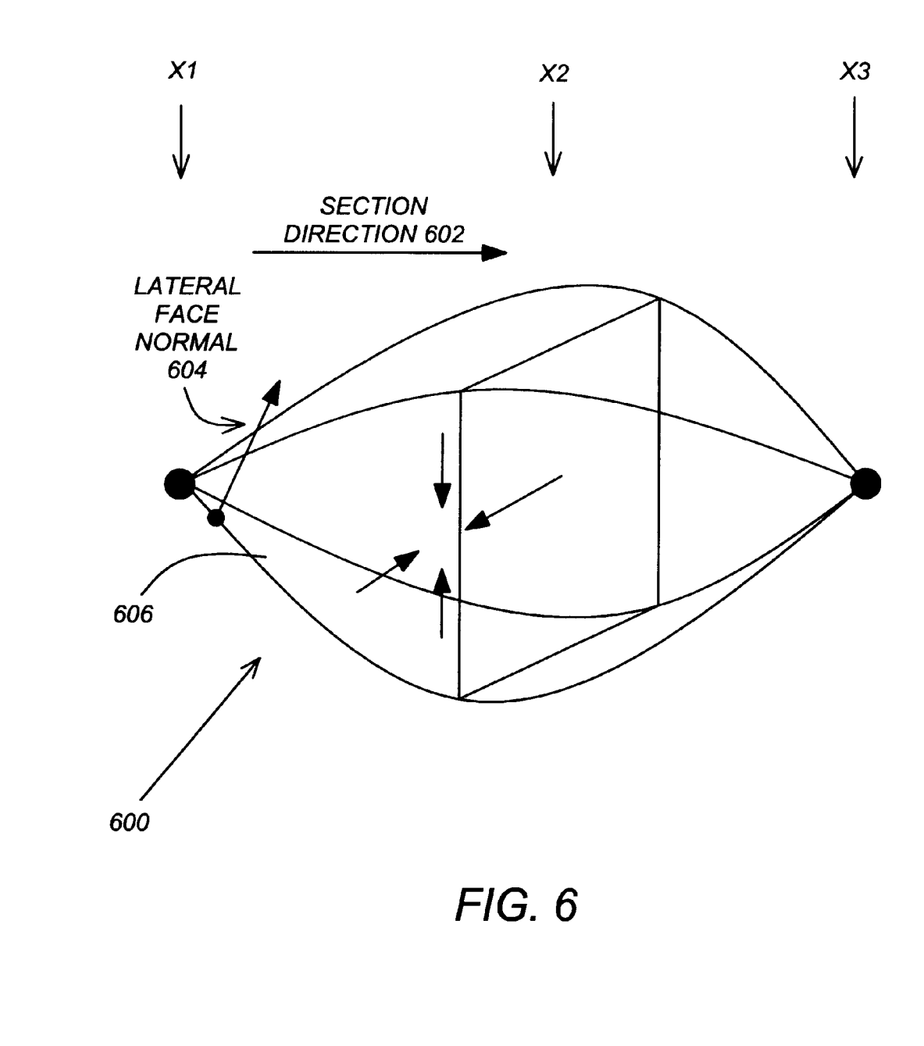
FIG. 6 illustrates a lofted solid comprised of three sections and four lateral faces, wherein two of the sections are degenerate.

FIG. 6 illustrates a lofted solid 600 comprised of three sections $\{X_1, X_2, X_3\}$, wherein two of the sections, both the START section $X_1$ and the END section $X_3$ are degenerate sections. Transverse faces do not exist for these degenerate sections. The section direction $v_r$ is shown as an arrow 602. The reference face normal ($f_n$) 604 is the normal of one of the lateral faces 606 at the degenerate START section $X_1$. Since the normal of the lateral face 606 at the degenerate START section $X_1$ is zero (exactly at that position), the system finds the normal at an infinitesimally small distance from the degenerate START section $X_1$, which will provide a non-zero normal. Equation 1.1 is satisfied and therefore the system applies the reverse operation.

Case 3: Closed

Figure 7A:
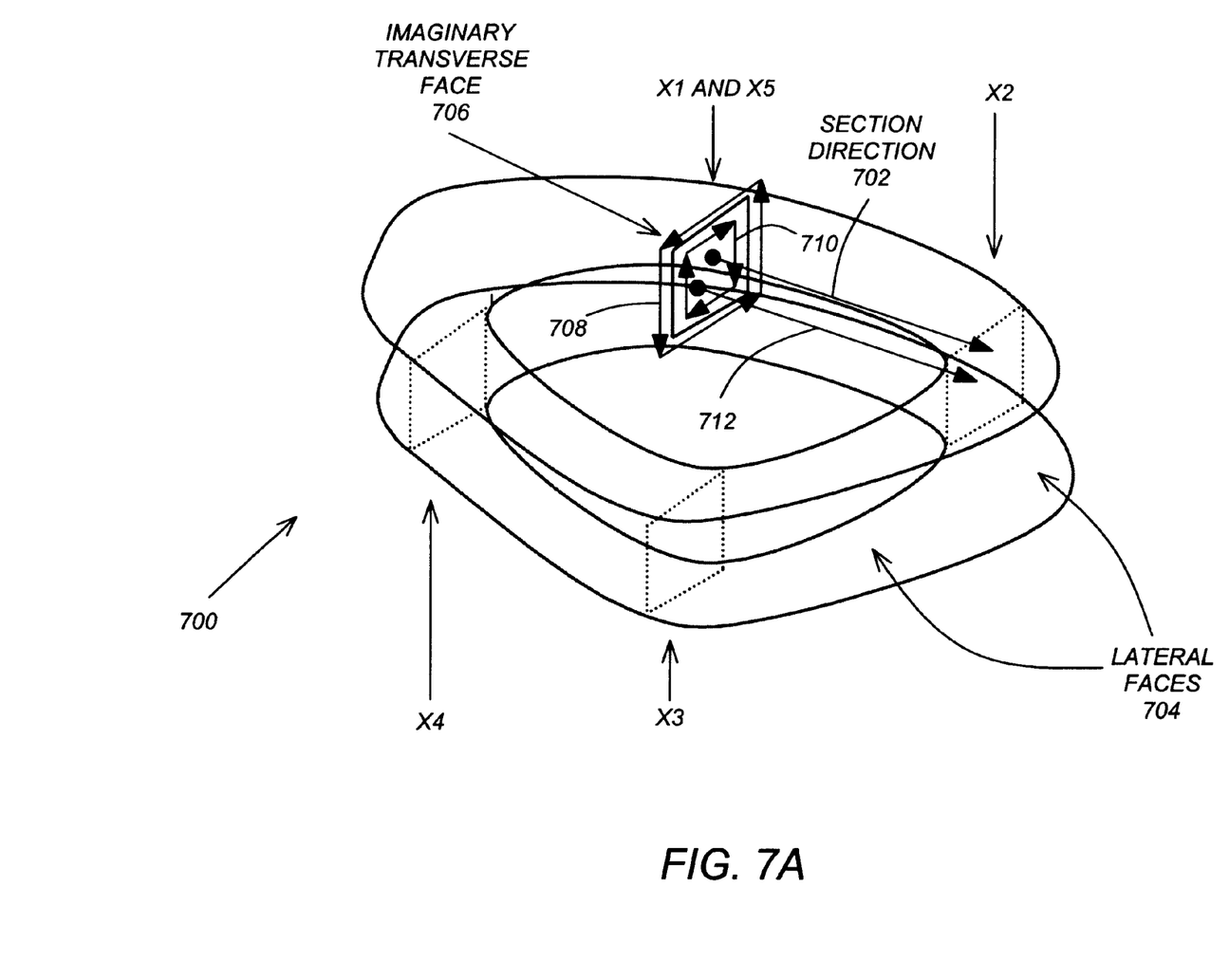
FIGS. 7A and 7B illustrate a closed lofted comprised of five sections.
Figure 7B:
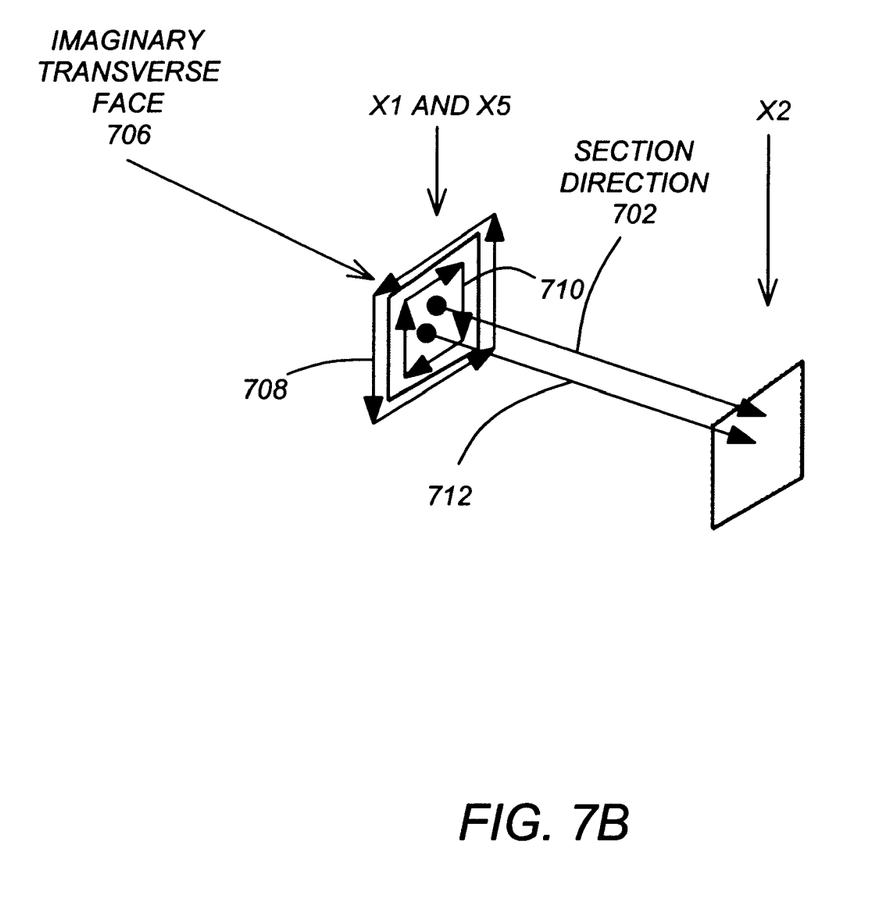

FIGS. 7A and 7B illustrate a closed lofted solid 700 with five sections $\{X_1, X_2, X_3, X_4, X_5\}$. In this example, the START section $X_1$ is the same as the END section $X_5$. Since no transverse faces exist, the reference face normal ($f_n$) is the normal of an imaginary START transverse face 706. The section direction $v_r$ is shown as an arrow 702 in FIG. 7B. To find the imaginary START face 706, the system uses an attribute on the segments of the START section $X_1$ before the lofted solid 700 is created. These attributes are propagated to the coedges of the lateral faces 704 during the creation of the lofted solid 700. As shown in FIGS. 7A and 7B, only the clockwise co-edges 710 (resulting from the START section $X_1$) will have these attributes and the counter-clockwise co-edges 708 (resulting from the END section $X_5$) will not have these attributes. After the lofted solid 700 is created, the system looks for the co-edges on the lofted solid 700 resulting from the start section $X_1$ into a list. Essentially, these co-edges are the partner co-edges of the imaginary START face 706. Therefore, the cross-product of any two successive co-edges in the list can be considered to give the face normal of an imaginary END transverse face 706. But we are interested in the face normal 712 of the imaginary START face 706. To get this, we negate the face normal of the imaginary END transverse face 706 to get the face normal 712 of the imaginary START face 706. By applying Equation 1.1, the system can detect that a reverse operation is required for the face normals.

Logic of the Graphics Program

FIGS. 8A, 8B, 8C, and 8D together are a flowchart that illustrates the general logic performed according to the preferred embodiment of the present invention. Those skilled in the art will recognize that this logic is provided for illustrative purposes only and that different logic may be used to accomplish the same results.

Figure 8A:
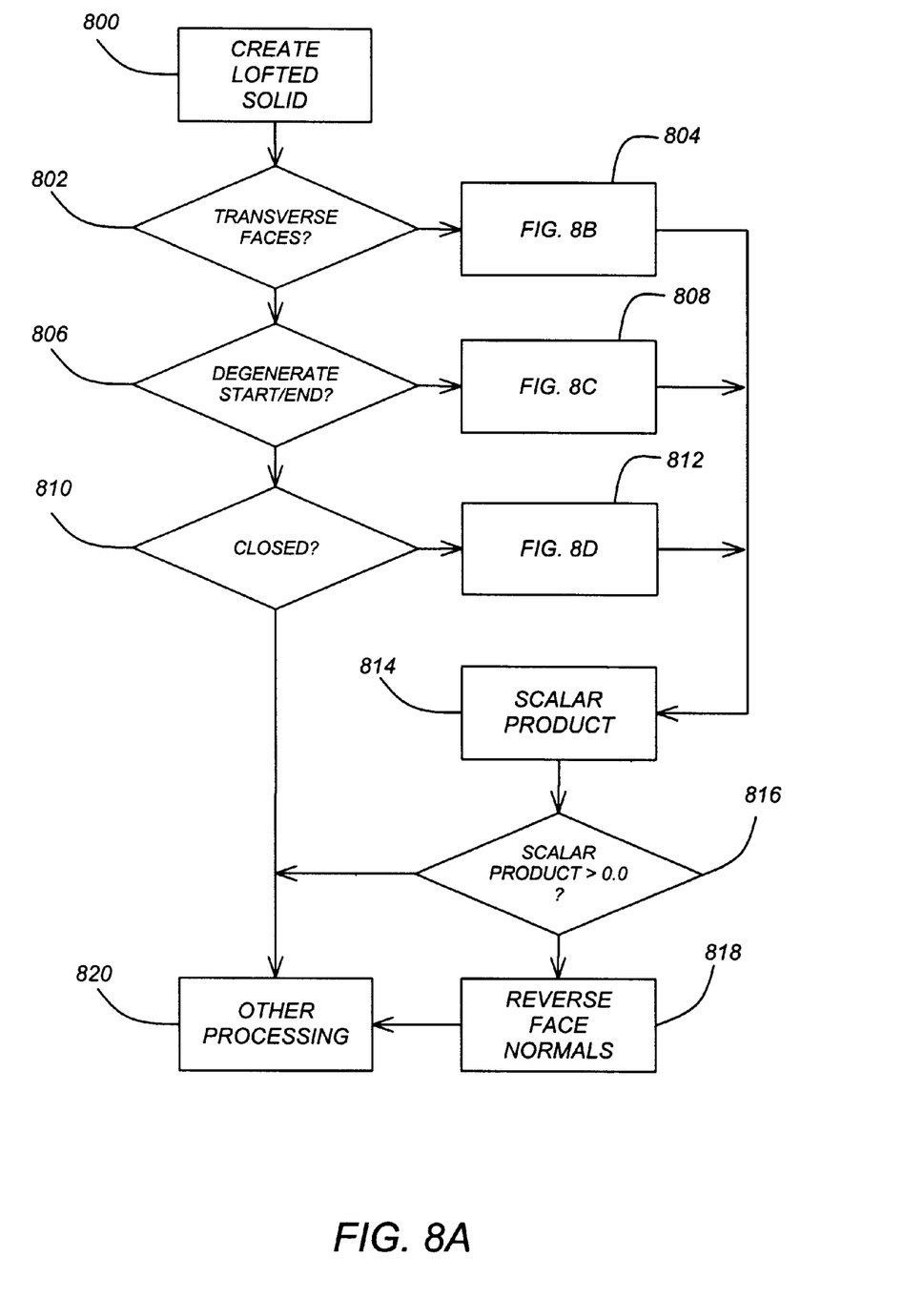
FIGS. 8A, 8B, 8C, and 8D together are a flowchart that illustrates the general logic performed according to the preferred embodiment of the present invention.

Block 800 represents the Geometric Modeler 204 creating the lofted solid.

Block 802 is a decision block that represents the Feature-Based Modeler 206 determining whether the lofted solid has START or END transverse faces. If so, control transfers to Block 804, which transfers control to FIG. 8B; otherwise, control transfers to Block 806.

Block 806 is a decision block that represents the Feature-Based Modeler 206 determining whether both the START and END sections are degenerate sections. If so, control transfers to Block 808, which transfers control to FIG. 8C; otherwise, control transfers to Block 810.

Figure 8B:
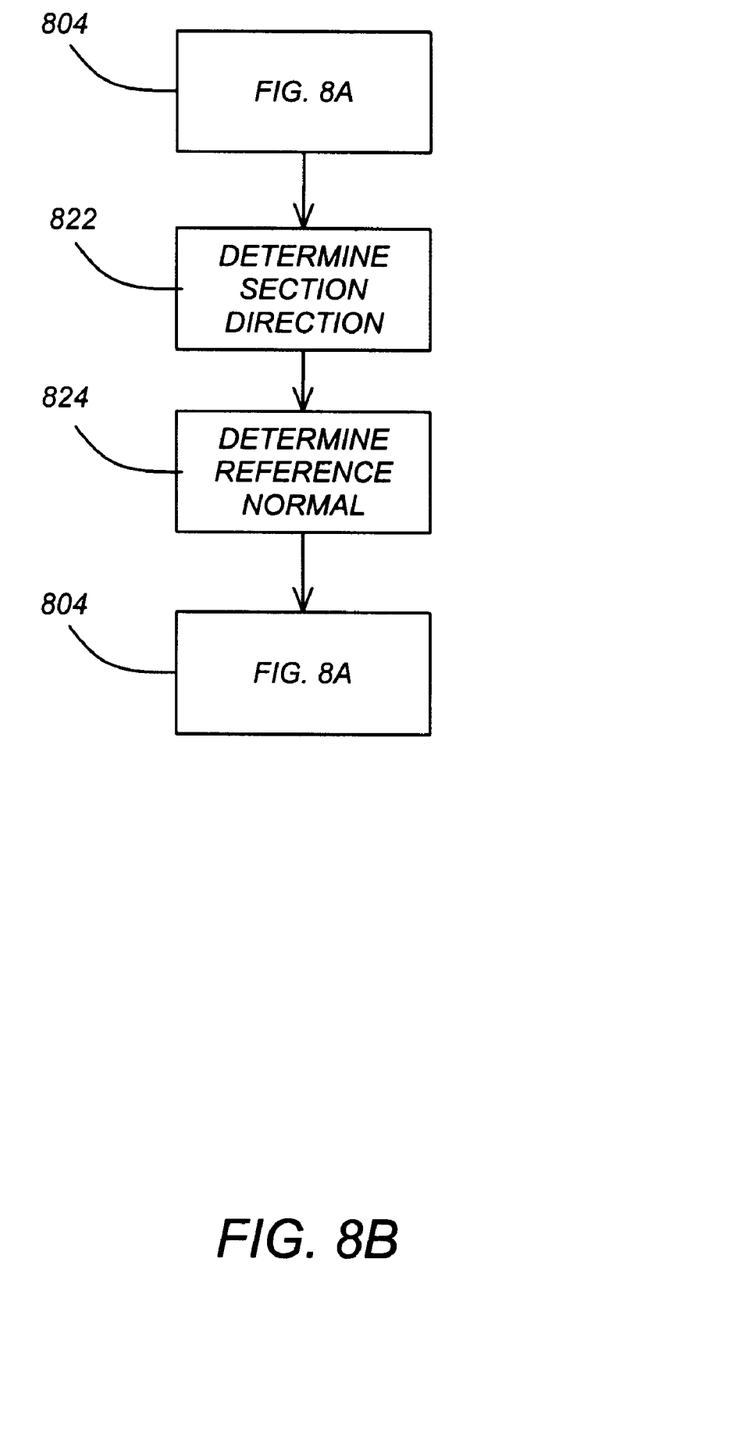
Figure 8C:
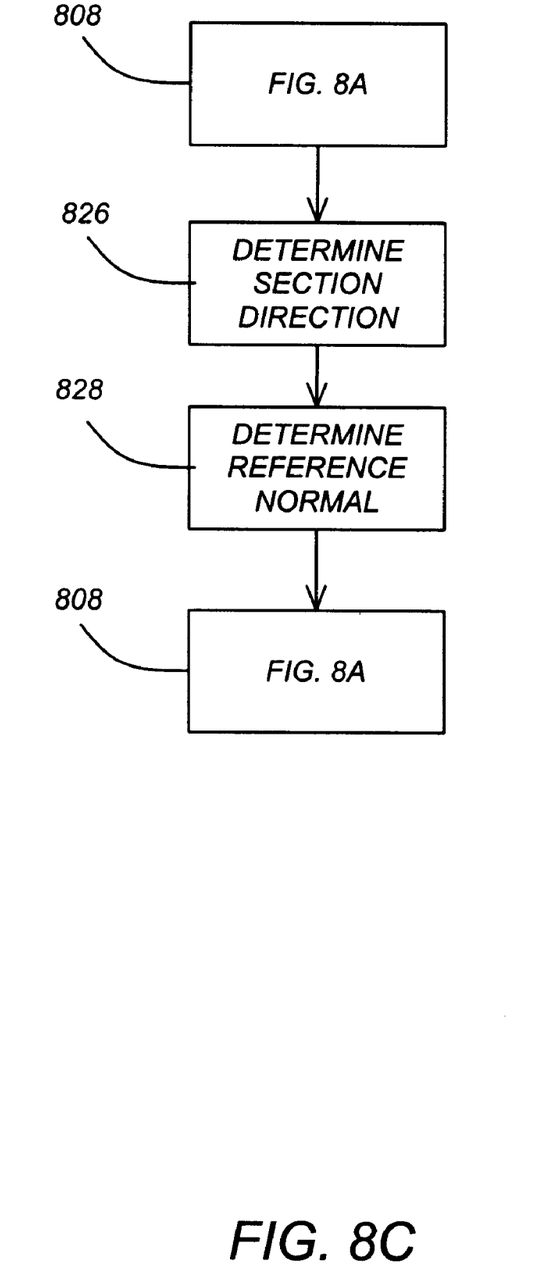
Figure 8D:
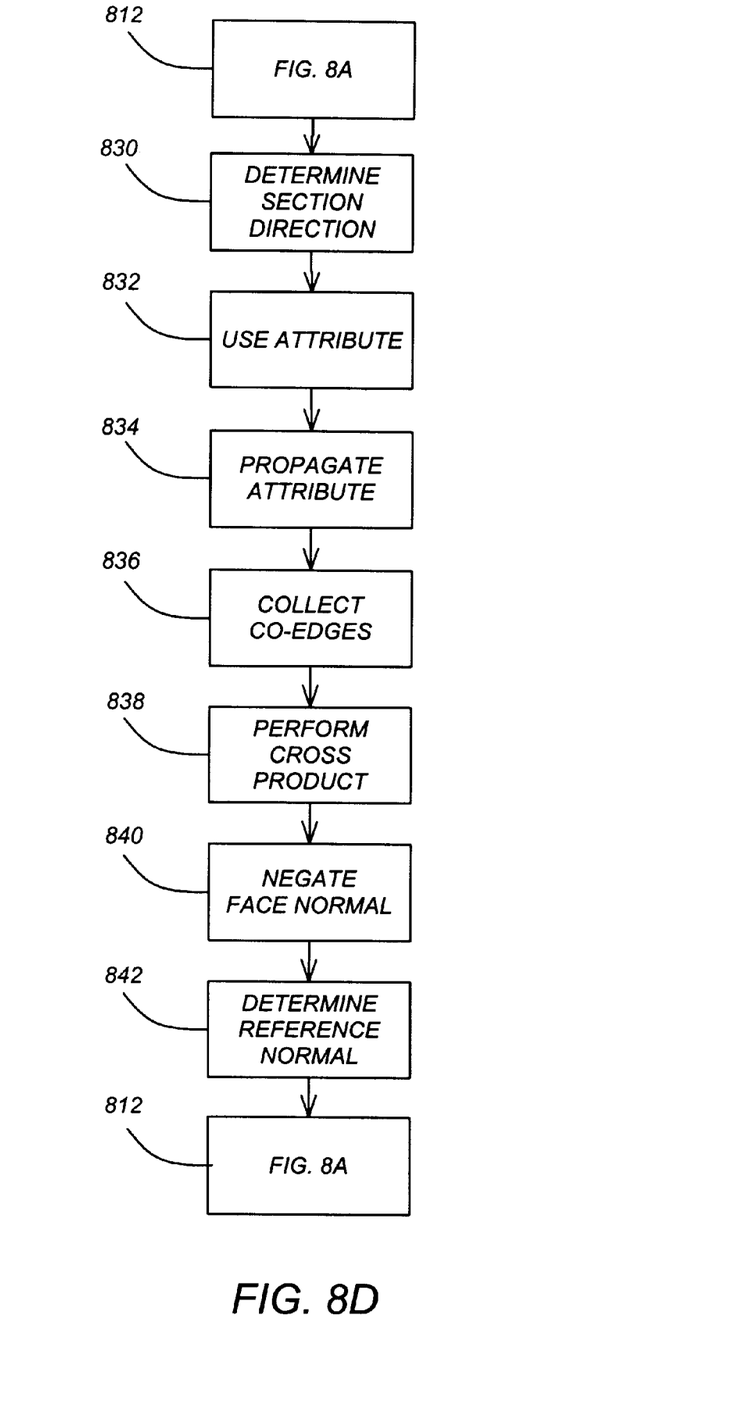

Block 810 is a decision block that represents the Feature-Based Modeler 206 determining whether the lofted solid is closed, which transfers control to FIG. 8D. If so, control transfers to Block 812; otherwise, control transfers to Block 820.

Upon retuning from FIGS. 8B, 8C, and 8D, control transfers to Block 814.

Block 814 represents the Feature-Based Modeler 206 performing a scalar product of the section direction ($v_r$) and the transverse face normal ($f_n$) i.e., ($v_r \cdot f_n$).

Block 816 is a decision block that represents the Feature-Based Modeler 206 determining whether scalar product is greater than zero, i.e., ($v_r \cdot f_n$)>0.0. If so, then the lofted solid is incorrectly oriented, and control transfers to Block 818; otherwise, the lofted solid is correctly oriented, and control transfers to Block 820.

Block 818 represents the Feature-Based Modeler 206 reversing the face normals of all the faces of the lofted solid.

Block 820 represents the Image Engine 202 performing other processing.

Referring now to FIG. 8B, control transfers to this figure from Block 804 in FIG. 8A.

Block 822 represents the Feature-Based Modeler 206 determining the section direction ($v_r$), which is a vector resulting from the difference of the geometric centers of two adjacent sections, beginning either from the START or END faces.

Block 824 represents the Feature-Based Modeler 206 determining the reference face normal ($f_n$), which is the face normal of either the START or END faces.

Thereafter, control transfers back to Block 804 in FIG. 8A.

Referring now to FIG. 8C, control transfers to this figure from Block 808 in FIG. 8A.

Block 826 represents the Feature-Based Modeler 206 determining the section direction ($v_r$), which is a vector resulting from the difference of the geometric centers of two adjacent sections, beginning either from the START or END faces.

Block 828 represents the Feature-Based Modeler 206 determining the reference face normal ($f_n$) which is the face normal of either the START or END faces, at an infinitesimally small distance from the degenerate START or END sections.

Thereafter, control transfers back to Block 808 in FIG. 8A.

Referring now to FIG. 8D, control transfers to this figure from Block 812 in FIG. 8A.

Block 830 represents the Feature-Based Modeler 206 determining the section direction ($v_r$), which is a vector resulting from the difference of the geometric centers of two adjacent sections, beginning either from the START or END faces.

Block 832 represents the Feature-Based Modeler 206 using an attribute on the segments of either the START or END sections before the lofted solid is created to find the imaginary START or END transverse face.

Block 834 represents the Feature-Based Modeler 206 propagating these attributes to the co-edges of the lateral faces during the creation of the lofted solid.

Block 836 represents the Feature-Based Modeler 206 looking for the co-edges on the lofted solid that have these attributes and collecting these co-edges into a list, wherein these co-edges are the partner co-edges of the imaginary START face.

Block 838 represents the Feature-Based Modeler 206 performing a cross-product of any two successive co-edges in the list in order to determine the face normal of an imaginary END transverse face.

Block 840 represents the Feature-Based Modeler 206 negating the face normal of the imaginary END transverse face to mimic the face normal of an imaginary START face.

Block 842 represents the Feature-Based Modeler 206 determining the reference face normal ($f_n$), which is the face normal of either the START or END faces, of an imaginary START or END transverse face.

Thereafter, control transfers back to Block 812 in FIG. 8A.

Conclusion

This concludes the description of the preferred embodiment of the invention. The following describes some alternative embodiments for accomplishing the present invention. For example, any type of computer, such as a mainframe, minicomputer, work station or personal computer, could be used with the present invention. In addition, any program, function, or system providing loft features in a graphical imaging environment could benefit from the present invention.

In summary, the present invention discloses a computer-implemented method, apparatus, and article of manufacture for detecting and correcting incorrectly oriented lofted solids in a computer-implemented, parametric feature-based, solid modeling system. The invention takes into consideration loft feature involving degenerate sections and closed cases.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented graphics system, comprising:
   (a) a computer; and
   (b) a feature-based modeler, executed by the computer, for processing a representation of a three-dimensional (3D) model that includes at least one lofted solid, wherein the feature-based modeler detects an incorrect orientation of the lofted solid in the 3D model and ensures that one or more face normals of the lofted solid are correctly oriented.

2. The system of claim 1, wherein the feature-based modeler reverses the face normals when the lofted solid is not correctly oriented.

3. The system of claim 2, wherein the feature-based modeler detects an incorrect orientation of the lofted solid using a scalar product of a section direction ($v_r$) and a transverse face normal ($f_n$) at either a starting or ending transverse face.

4. The system of claim 3, wherein the feature-based modeler applies a reverse operation on the lofted solid if $(v_r \cdot f_n) > 0$.

5. The system of claim 4, wherein the reverse operation "flips" the normals of all the faces in the lofted solid in cases involving non-degenerate sections.

6. The system of claim 5, wherein the feature-based modeler detects an incorrect orientation of the lofted solid using a scalar product of a section direction ($v_r$) and a reference face normal ($f_n$) of a lateral face of the lofted solid, wherein the reference face normal ($f_n$) is determined at a position a distance away from a degenerate starting or ending section for the lofted solid, when the lofted solid does not have a transverse face.

7. The system of claim 6, wherein the feature-based modeler applies a reverse operation on the lofted solid if $(v_r \cdot f_n) > 0$.

8. The system of claim 7, wherein the reverse operation "flips" the normals of all the faces in the lofted solid in lofts involving degenerate sections.

9. The system of claim 8, wherein the feature-based modeler detects an incorrect orientation of the lofted solid using a scalar product of a section direction ($v_r$) and a reference face normal ($f_n$) of an imaginary starting or ending transverse face of the lofted solid, when the lofted solid does not have transverse faces and the lofted solid is closed.

10. The system of claim 9, wherein the reference face normal ($f_n$) of the imaginary starting or ending transverse face of the lofted solid is determined by using an attribute on a segment of a starting section before the lofted solid is created, by propagating the attribute to co-edges of one or more lateral faces during the creation of the lofted solid, and by generating a cross-product of any two successive co-edges in the list to provide the reference face normal of the imaginary ending transverse face, and by negating the reference face normal of the imaginary ending transverse face to mimic the reference face normal of the imaginary starting face.

11. The system of claim 10, wherein the feature-based modeler applies a reverse operation on the lofted solid if $(v_r \cdot f_n) > 0$.

12. The system of claim 11, wherein the reverse operation "flips" the normals of all the faces in the lofted solid in closed cases.

13. A computer-implemented method of processing a three-dimensional (3D) model that includes at least one lofted solid, comprising:
   (a) detecting an incorrect orientation of the lofted solid in the 3D model; and
   (b) ensuring that one or more face normals of the lofted solid are correctly oriented in response to the detected incorrect orientation.

14. The method of claim 13, wherein the ensuring step further comprises the step of reversing the face normals when the lofted solid is not correctly oriented.

15. The method of claim 14, wherein the detecting step further comprises the step of detecting an incorrect orientation of the lofted solid using a scalar product of a section direction ($v_r$) and a transverse face normal ($f_n$) at either a starting or ending transverse face.

16. The method of claim 15, wherein the ensuring step further comprises the step of applying a reverse operation on the lofted solid if $(v_r \cdot f_n) > 0$.

17. The method of claim 16, wherein the reverse operation "flips" the normals of all the faces in the lofted solid in cases involving non-degenerate sections.

18. The method of claim 17, wherein the detecting step further comprises the step of detecting an incorrect orientation of the lofted solid using a scalar product of a section direction ($v_r$) and a reference face normal ($f_n$) of a lateral face of the lofted solid, wherein the reference face normal ($f_n$) is determined at a position a distance away from a degenerate starting or ending section for the lofted solid, when the lofted solid does not have a transverse face.

19. The method of claim 18, wherein the ensuring step further comprises the step of applying a reverse operation on the lofted solid if ($v_r \cdot f_n$)>0.

20. The method of claim 19, wherein the reverse operation "flips" the normals of all the faces in the lofted solid in lofts involving degenerate sections.

21. The method of claim 20, wherein the detecting step further comprises the step of detecting an incorrect orientation of the lofted solid using a scalar product of a section direction ($v_r$) and a reference face normal ($f_n$) of an imaginary starting or ending transverse face of the lofted solid, when the lofted solid does not have transverse faces and the lofted solid is closed.

22. The method of claim 21, wherein the reference face normal ($f_n$) of the imaginary starting or ending transverse face of the lofted solid is determined by using an attribute on a segment of a starting section before the lofted solid is created, by propagating the attribute to co-edges of one or more lateral faces during the creation of the lofted solid, and by generating a cross-product of any two successive co-edges in the list to provide the reference face normal of the imaginary ending transverse face, and by negating the reference face normal of the imaginary ending transverse face to mimic the reference face normal of the imaginary starting face.

23. The method of claim 22, wherein the ensuring step further comprises the step of applying a reverse operation on the lofted solid if ($v_r \cdot f_n$)>0.

24. The method of claim 23, wherein the reverse operation "flips" the normals of all the faces in the lofted solid in closed cases.

25. An article of manufacture embodying logic for performing a computer-implemented method of processing a three-dimensional (3D) model that includes at least one lofted solid, the method comprising:

(a) detecting an incorrect orientation of the lofted solid in the 3D model; and (b) ensuring that one or more face normals of the lofted solid are correctly oriented in response to the detected incorrect orientation.

26. The method of claim 25, wherein the ensuring step further comprises the step of reversing the face normals when the lofted solid is not correctly oriented.

27. The method of claim 26, wherein the detecting step further comprises the step of detecting an incorrect orientation of the lofted solid using a scalar product of a section direction ($v_r$) and a transverse face normal ($f_n$) at either a starting or ending transverse face.

28. The method of claim 27, wherein the ensuring step further comprises the step of applying a reverse operation on the lofted solid if ($V_r \cdot f_n$)>0.

29. The method of claim 28, wherein the reverse operation "flips" the normals of all the faces in the lofted solid in cases involving non-degenerate sections.

30. The method of claim 29, wherein the detecting step further comprises the step of detecting an incorrect orientation of the lofted solid using a scalar product of a section direction ($v_r$) and a reference face normal ($f_n$) of a lateral face of the lofted solid, wherein the reference face normal ($f_n$) is determined at a position a distance away from a degenerate starting or ending section for the lofted solid, when the lofted solid does not have a transverse face.

31. The method of claim 30, wherein the ensuring step further comprises the step of applying a reverse operation on the lofted solid if ($v_r \cdot f_n$)>0.

32. The method of claim 31, wherein the reverse operation "flips" the normals of all the faces in the lofted solid in lofts involving degenerate sections.

33. The method of claim 32, wherein the detecting step further comprises the step of detecting an incorrect orientation of the lofted solid using a scalar product of a section direction ($v_r$) and a reference face normal ($f_n$) of an imaginary starting or ending transverse face of the lofted solid, when the lofted solid does not have transverse faces and the lofted solid is dosed.

34. The method of claim 33, wherein the reference face normal ($f_n$) of the imaginary starting or ending transverse face of the lofted solid is determined by using an attribute on a segment of a starting section before the lofted solid is created, by propagating the attribute to co-edges of one or more lateral faces during the creation of the lofted solid, and by generating a cross-product of any two successive co-edges in the list to provide the reference face normal of the imaginary ending transverse face, and by negating the reference face normal of the imaginary ending transverse face to mimic the reference face normal of the imaginary starting face.

35. The method of claim 34, wherein the ensuring step further comprises the step of applying a reverse operation on the lofted solid if ($v_r \cdot f_n$)>0.

36. The method of claim 35, wherein the reverse operation "flips" the normals of all the faces in the lofted solid in closed cases.

* * * * *

UNITED STATES PATENT AND TRADEMARK OFFICE
CERTIFICATE OF CORRECTION

PATENT NO. : 6,486,878 B1
DATED : November 26, 2002
INVENTOR(S) : Somashekar Ramachandran Subrahmanyam, Mahabaduge Janaka and Kithsiri Jayasuriya It is certified that error appears in the above-identified patent and that said Letters Patent is hereby corrected as shown below:

<u>Title page,</u>
Item [75], Inventors, "Janakakithsiri" should read -- Janaka Kithsiri --

Item [56], References Cited, OTHER PUBLICATIONS, "Jiri Kripac" reference "Persistantly" should read -- Persistently --

<u>Column 10,</u>
Line 6, "$V_r$" should read -- $v_r$ --
Line 31, "dosed" should read -- closed --

Signed and Sealed this

Nineteenth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,486,878 B1
DATED          : November 26, 2002
INVENTOR(S)    : Somashekar Ramachandran Subrahmanyam and Mahabaduge Janaka Kithsiri Jayasuriya It is certified that error appears in the above-identified patent and that said Letters Patent is hereby corrected as shown below:

<u>Title page,</u>
Item [75], Inventors, "Janakakithsiri" should read -- Janaka Kithsiri --

Item [56], References Cited, OTHER PUBLICATIONS, "Jiri Kripac" reference "Persistantly" should read -- Persistently --

<u>Column 10,</u>
Line 6, "$V_r$" should read -- $v_r$ --
Line 31, "dosed" should read -- closed --

This certificate supersedes Certificate of Correction issued August 19, 2003.

Signed and Sealed this

Eighteenth Day of November, 2003

JAMES E. ROGAN
*Director of the United States Patent and Trademark Office*